(12) United States Patent
Wu

(10) Patent No.: US 11,733,797 B2
(45) Date of Patent: Aug. 22, 2023

(54) TOUCH DISPLAY APPARATUS AND OPERATING METHOD THEREOF

(71) Applicant: ViewSonic International Corporation, New Taipei (TW)

(72) Inventor: Shu-Kai Wu, New Taipei (TW)

(73) Assignee: ViewSonic International Corporation, New Taipei (TW)

(*) Notice: Subject to any disclaimer, the term of this patent is extended or adjusted under 35 U.S.C. 154(b) by 0 days.

(21) Appl. No.: 17/489,731

(22) Filed: Sep. 29, 2021

(65) Prior Publication Data
US 2022/0100344 A1    Mar. 31, 2022

(30) Foreign Application Priority Data
Sep. 30, 2020    (TW) .................... 109134124

(51) Int. Cl.
*G06F 3/041*    (2006.01)
(52) U.S. Cl.
CPC ........ *G06F 3/04166* (2019.05); *G06F 3/0412* (2013.01); *G06F 3/04162* (2019.05)
(58) Field of Classification Search
CPC . G06F 3/04166; G06F 3/04162; G06F 3/0412
See application file for complete search history.

(56) References Cited

U.S. PATENT DOCUMENTS

2019/0121522 A1* 4/2019 Davis .................. G02B 27/017

FOREIGN PATENT DOCUMENTS

| CN | 101382868 | 5/2012 |
|---|---|---|
| CN | 102968215 | 3/2013 |
| CN | 103257818 | 8/2013 |
| CN | 103118166 | 11/2014 |
| CN | 102915201 | 8/2015 |
| CN | 103365598 | 2/2017 |
| CN | 103593138 | 11/2017 |
| CN | 110740309 | 1/2020 |

\* cited by examiner

*Primary Examiner* — Lisa S Landis
(74) *Attorney, Agent, or Firm* — JCIPRNET

(57) ABSTRACT

A touch display apparatus including a touch display screen and a processor circuit is provided. The touch display screen is configured to display an image frame and sense a touch operation. The processor circuit is coupled to the touch display screen. The processor circuit is configured to divide a display interface of the touch display screen into a plurality of blocks according to an interface dividing parameter. The image frame is displayed in the block where the touch operation is located according to a position of the touch operation.

15 Claims, 9 Drawing Sheets

TOUCH DISPLAY APPARATUS AND OPERATING METHOD THEREOF

CROSS-REFERENCE TO RELATED APPLICATION

This application claims the priority benefit of Taiwanese application no. 109134124, filed on Sep. 30, 2020. The entirety of the above-mentioned patent application is hereby incorporated by reference herein and made a part of this specification.

BACKGROUND OF THE INVENTION

Field of the Invention

The invention relates to a display apparatus and an operating method thereof, and particularly relates to a touch display apparatus and an operating method thereof.

Description of Related Art

Generally speaking, a large touch display screen is often used in application scenarios in education, teaching, and business meetings. In the above application scenarios, the user interacts with the touch display screen to perform a touch operation. However, due to the larger screen size, the user usually needs to spend more time searching for an object displayed on the screen. If the object to be selected on the screen is farther away from the user, then the user needs to move their footsteps left and right or extend their arm to select the desired object.

Moreover, for the display content of the current large touch display screen (a touch display screen larger than 55 inches), the display interface thereof mostly adopts a configuration design of directly transplanting to a mobile phone or a tablet computer. In particular, third-party applications have not really taken into consideration the interaction needs of the large touch display screen and the user. In addition, the current large touch display screen also cannot distinguish the user's standing position and the operable region range, and therefore may not provide a good user experience.

SUMMARY OF THE INVENTION

The invention provides a touch display apparatus and an operating method thereof that may provide a good user experience.

A touch display apparatus of the invention includes a touch display screen and a processor circuit. The touch display screen is configured to display an image frame and sense a touch operation. The processor circuit is coupled to the touch display screen. The processor circuit is configured to divide a display interface of the touch display screen into a plurality of blocks according to an interface dividing parameter. The image frame is displayed in the block where the touch operation is located according to a position of the touch operation.

In an embodiment of the invention, the processor circuit divides a screen width of the touch display screen by a preset body size to calculate the interface dividing parameter.

In an embodiment of the invention, the interface dividing parameter is calculated by dividing a screen width of the touch display screen by a preset body size, and is stored in the firmware. By reading the interface dividing parameter stored in the firmware, the processor circuit divides the touch display screen into a plurality of blocks according to the interface dividing parameter.

In an embodiment of the invention, the touch display apparatus further includes an image capture apparatus. The image capture apparatus is coupled to the processor circuit. The image capture apparatus is configured to capture an image of a user to obtain a measured body size of the user. The processor circuit divides a screen width of the touch display screen by the measured body size to calculate the interface dividing parameter.

In an embodiment of the invention, the processor circuit determines the position of the touch operation according to an image of the user.

In an embodiment of the invention, the touch operation includes a touch gesture operated on the touch display screen, or a stylus tapping on the touch display screen. The processor circuit determines the block where the touch operation is located according to the touch gesture or a position of the stylus.

In an embodiment of the invention, the touch display apparatus further includes at least one button. The button is disposed in an outer frame region of the touch display screen. The button is configured to output a switching signal according to the position of the touch operation. The image frame is displayed in the block where the touch operation is located according to the switching signal.

An operating method of a touch display apparatus of the invention includes: dividing the display interface of the touch display screen into a plurality of blocks according to an interface dividing parameter; sensing a touch operation on the touch display screen; and displaying an image frame in the block where the touch operation is located according to a position of the touch operation. The interface dividing parameter is determined by dividing a screen width of the touch display screen by a body size.

In an embodiment of the invention, the operating method of the touch display apparatus further includes: displaying a global image frame on the touch display screen; and determining whether the touch operation on the touch display screen is sensed.

In an embodiment of the invention, the operating method of the touch display apparatus further includes: returning to the step of displaying the global image frame on the touch display screen when it is determined that the touch operation on the touch display screen is not sensed; and determining whether the touch display apparatus supports an image recognition function when it is determined that the touch operation on the touch display screen is sensed.

In an embodiment of the invention, the operating method of the touch display apparatus further includes: dividing the screen width of the touch display screen by a preset body size to calculate the interface dividing parameter when the touch display apparatus does not support the image recognition function.

In an embodiment of the invention, the operating method of the touch display apparatus further includes: dividing the touch display screen into a plurality of blocks according to the interface dividing parameter by reading the interface dividing parameter stored in a firmware when the touch display apparatus does not support the image recognition function. The interface dividing parameter is calculated by dividing the screen width of the touch display screen by a preset body size, and is stored in the firmware.

In an embodiment of the invention, the operating method of the touch display apparatus further includes: capturing an image of a user to obtain a measured body size of the user when the touch display apparatus supports the image recognition function; and dividing the screen width of the touch display screen by the measured body size to calculate the interface dividing parameter.

In an embodiment of the invention, the operating method of the touch display apparatus further includes: determining the position of the touch operation according to the image of the user.

In an embodiment of the invention, the operating method of the touch display apparatus further includes: determining the block where the touch operation is located according to a touch gesture or a position of a stylus.

In an embodiment of the invention, the operating method of the touch display apparatus further includes: outputting a switching signal from at least one button according to the position of the touch operation; and displaying the image frame in the block where the touch operation is located according to the switching signal.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the embodiments of the invention, the touch display apparatus and the operating method thereof take into consideration the body size (anthropometry) and the standing position of the user, and reduce the movement and search time of the user via a user interface design method, thus allowing the user to readily perform an interface operation.

Figure 1:
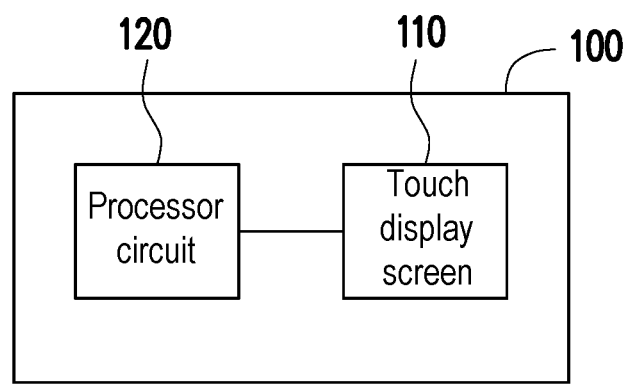
FIG. 1 shows a schematic diagram of a touch display apparatus of an embodiment of the invention.
Figure 2:
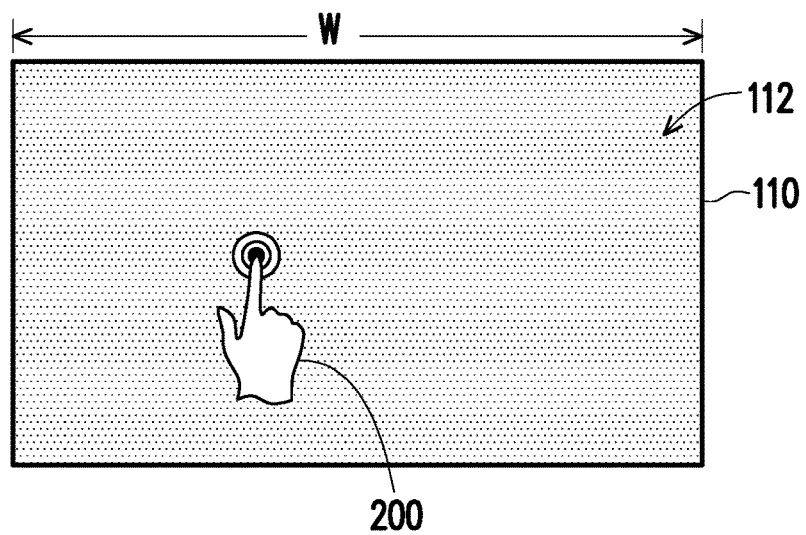
FIG. 2 shows a schematic diagram of the touch display screen of the embodiment of FIG. 1 displaying an image frame in a full-screen manner.
Figure 3A:
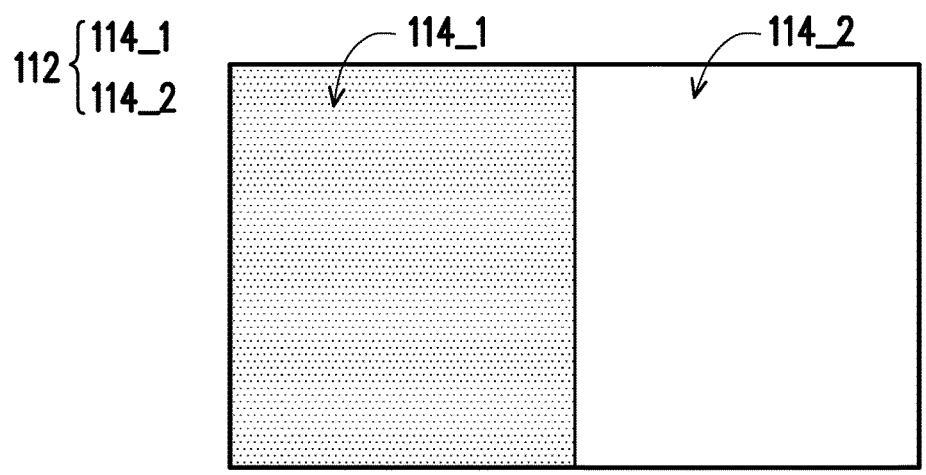
FIG. 3A and FIG. 3B show schematic diagrams of display interfaces of touch display screens of different embodiments of the invention being divided into a plurality of blocks.
Figure 3B:
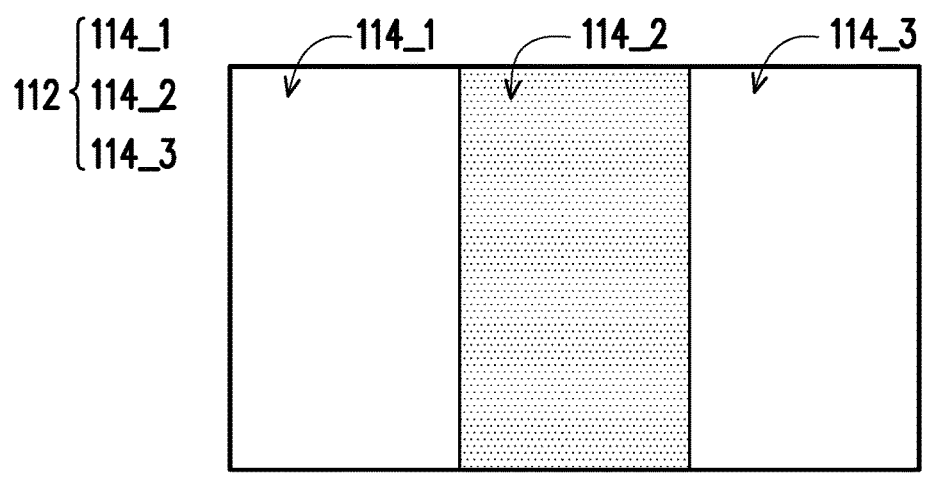

FIG. 1 shows a schematic diagram of a touch display apparatus of an embodiment of the invention. FIG. 2 shows a schematic diagram of the touch display screen of the embodiment of FIG. 1 displaying an image frame in a full-screen manner. FIG. 3A and FIG. 3B show schematic diagrams of a display interface of a touch display screen of different embodiments of the invention being divided into a plurality of blocks.

Referring to FIG. 1 to FIG. 3B, a touch display apparatus 100 of the present embodiment includes a touch display screen 110 and a processor circuit 120. The processor circuit 120 is coupled to the touch display screen 110. The touch display screen 110 is configured to display an image frame and sense a touch operation 200. The processor circuit 120 is configured to control the touch display screen 110 to sense the touch operation 200 and display an image frame.

In FIG. 2, the touch display screen 110 displays an image frame on the display interface 112 thereof in a full-screen manner. In other words, the display interface 112 is not yet divided into a plurality of blocks, and what is displayed on the touch display screen 110 is a global image frame. In the present embodiment, the processor circuit 120 may divide the display interface 112 of the touch display screen 110 into a plurality of blocks according to an interface dividing parameter, and the image frame is displayed in the block where the touch operation 200 is located according to the position of the touch operation 200. For example, in FIG. 3A, the display interface 112 is divided into two blocks 114_1 and 114_2. The image frame is displayed in the block 114_1 where the touch operation 200 is located according to the position of the touch operation 200. In FIG. 3B, the display interface 112 is divided into three blocks 114_1, 114_2, and 114_3. The image frame is displayed in the block 114_2 where the touch operation 200 is located according to the position of the touch operation 200. In FIG. 3A and FIG. 3B, the number of divided blocks of the display interface 112 is merely illustrative, and is not intended to limit the invention.

In the present embodiment, the touch operation 200 is, for example, a touch gesture operated on the touch display screen 110, including a long press, a left-right slide, or a double-tap, but the invention is not limited thereto. In an embodiment, the touch operation 200 is, for example, a stylus tapping on the touch display screen 110. The processor circuit 120 may determine the block where the touch operation 200 is located according to the touch gesture or the position of the stylus. Sufficient teaching, suggestion, and implementation description of the method of the processor circuit 120 determining the touch gesture or the position of the stylus and the block where the touch operation 200 is located may be obtained from common knowledge in the relevant technical field.

In the present embodiment, the processor circuit 120 divides a display interface 112 of the touch display screen 110 into a plurality of blocks according to an interface dividing parameter. The interface dividing parameter determines the number of divided blocks of the display interface 112. The interface dividing parameter may be calculated by the processor circuit 120 or stored in the firmware of the touch display apparatus 100 in advance.

For example, in an embodiment, when the touch display apparatus 100 displays an image frame under the operating system thereof, the processor circuit 120 divides a screen width W of the touch display screen 110 by the preset body size to calculate the interface dividing parameter. In other words, when the image frame is displayed under the operating system, the processor circuit 120 obtains a calculation result N by dividing the screen width W of the touch display screen 110 by the preset body size via the system software program. Next, the processor circuit 120 unconditionally rounds off the calculation result to an integer [N] thereof. The integer [N] is the interface dividing parameter representing the number of divided blocks of the display interface 112 in the horizontal direction.

In an embodiment, when the touch display apparatus 100 receives and displays an image frame via an external signal source, the processor circuit 120 divides the touch display screen 110 into a plurality of blocks by reading the interface dividing parameter stored in the firmware. The interface dividing parameter is calculated by dividing the screen width W of the touch display screen 110 by a preset body size, and is stored in the firmware in advance. The external signal source includes, but is not limited to, a high-definition multimedia interface (HDMI) or a computer. In other words, before the touch display apparatus 100 is shipped, the calculation result [N] of the interface dividing parameter, that is, the number of divided blocks of the display interface 112 in the horizontal direction, is first set in the touch display apparatus 100 in advance via a firmware.

Figure 4:
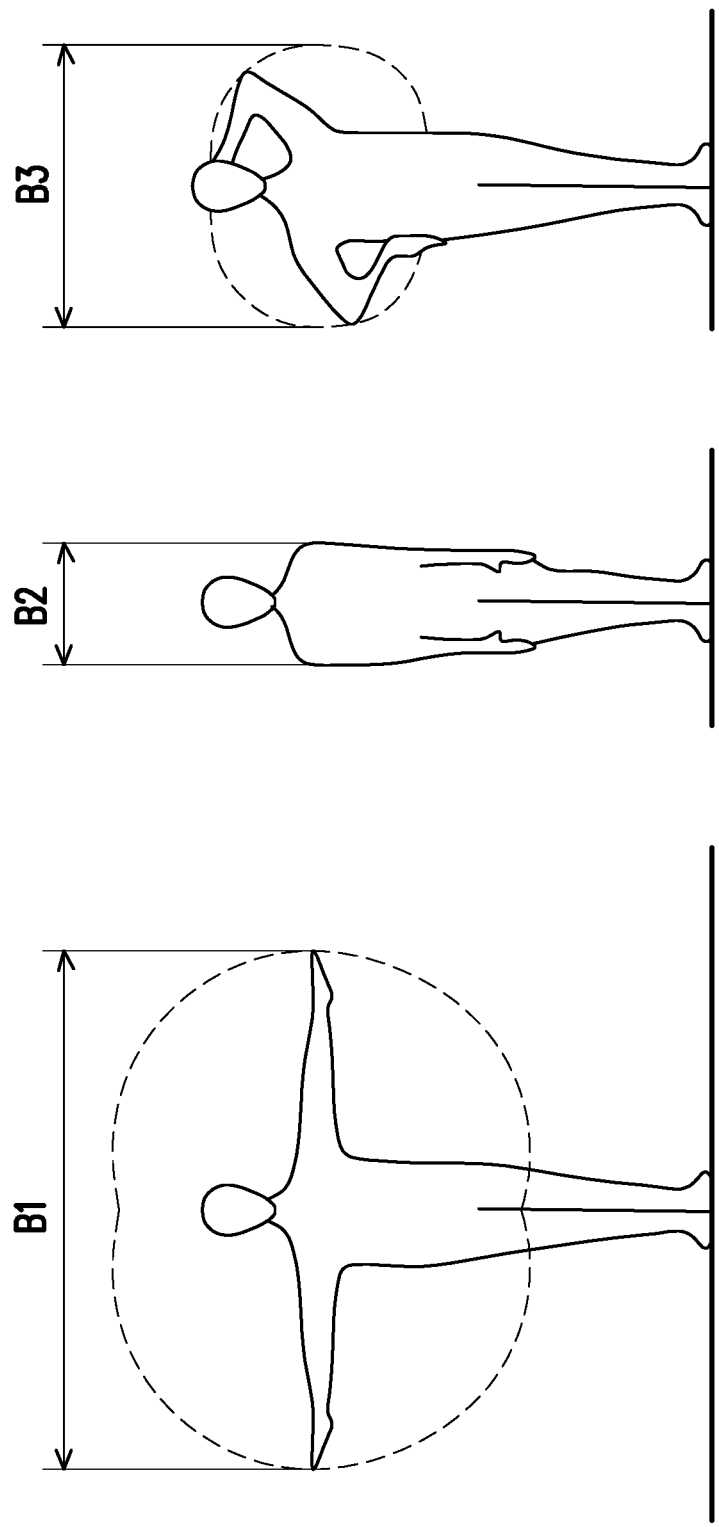
FIG. 4 shows a schematic diagram of a body size of an embodiment of the invention.

In the present embodiment, the interface dividing parameter [N] is calculated by dividing the screen width W of the touch display screen 110 by a preset body size. FIG. 4 shows a schematic diagram of a body size of an embodiment of the invention. The preset body size is, for example, any one of three sizes B1, B2, and B3 as shown in FIG. 4. In FIG. 4, the body size B1 is the maximum width of the user's left and right arms, the body size B2 is the user's shoulder width, and the body size B3 is the width of the user's arm joint movement range in a specific posture. The preset body sizes B1, B2, and B3 are used as the denominator of the interface dividing parameter [N], and may be a constant. In FIG. 4, the preset body sizes B1, B2, and B3 are merely illustrative and are not used to limit the invention.

In the present embodiment, the preset body size is, for example, any one of three sizes B1, B2, and B3 as shown in FIG. 4, but the invention is not limited thereto. In an embodiment, as the denominator for calculating the interface dividing parameter [N], the body size may also be measured by the image capture apparatus of the touch display apparatus 100.

In the present embodiment, the processor circuit 120 includes, for example, a central processing unit (CPU), a microprocessor, a digital signal processor (DSP), a programmable controller, a programmable logic device (PLD), or other similar apparatuses, or a combination of the apparatuses may be included, and the invention is not limited thereto. Moreover, in an embodiment, the calculation method of the interface dividing parameter may be implemented as a plurality of program codes. The program codes are stored in one memory, and the program codes are executed by the processor circuit 120.

In the present embodiment, the touch display apparatus 100 may further include a circuit or a module needed to perform a touch sensing operation and an image display operation. For example, the touch display apparatus 100 may further include a circuit or a module such as a main circuit board, a power board, an embedded computer, a speaker, an audio-visual interface, a network interface, a physical button, and/or a data transmission interface. In the present embodiment, the operating system built in the touch display apparatus 100 is, for example, an Android system, but the invention is not limited thereto.

In the present embodiment, the touch display screen 110 is, for example, a panel of a similar flat panel display, curved display, or stereoscopic image display such as a liquid-crystal display (LCD), an organic light-emitting display (OLED), a field-emission display (FED), an electro-phoretic display (EPD), or a light-emitting diode display with touch function, but the invention is not limited thereto.

Figure 5A:
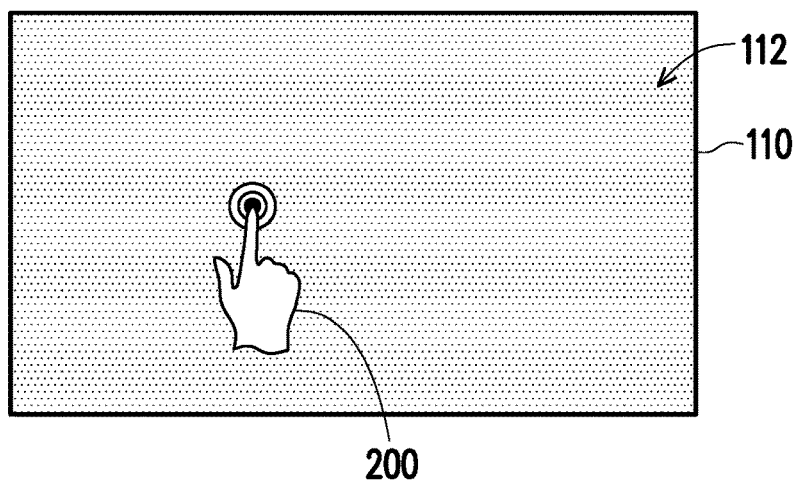
FIG. 5A, FIG. 5B, and FIG. 5C show a touch display screen of an embodiment of the invention switching display blocks of an image frame thereof according to a position of a touch operation.
Figure 5B:
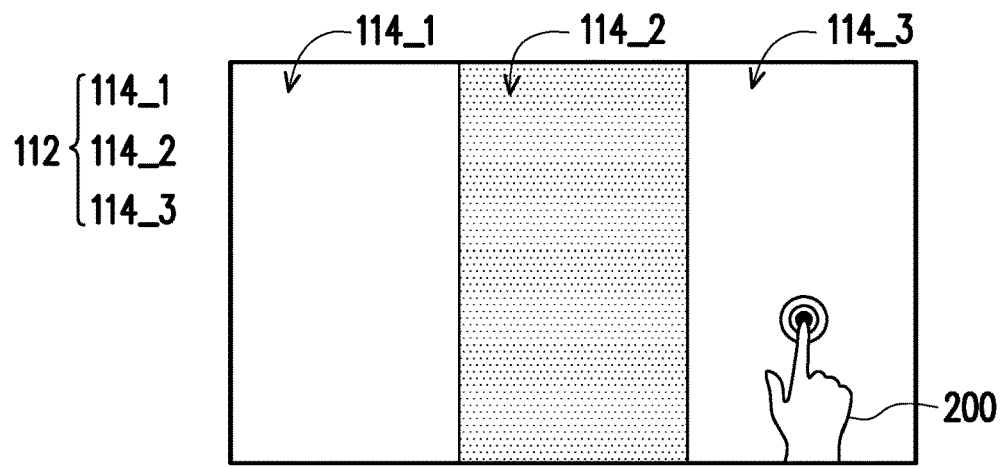
Figure 5C:
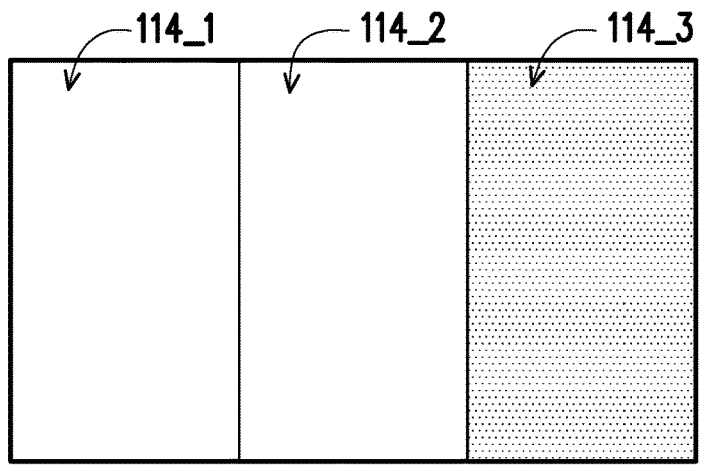

FIG. 5A, FIG. 5B, and FIG. 5C show a touch display screen of an embodiment of the invention switching display blocks of an image frame thereof according to the position of a touch operation. Referring to FIG. 5A to FIG. 5C, in FIG. 5A, the touch display screen 110 displays an image frame on the display interface 112 thereof in a full-screen manner. The touch operation 200 triggers the interface dividing function. The touch operation 200 is, for example, a touch gesture operated on the touch display screen 110, including a long press, a left-right slide, or a double-tap. In the present embodiment, the display interface 112 is divided into the three blocks 114_1, 114_2, 114_3 as an example.

The processor circuit 120 determines the block where the touch operation 200 is located according to the position of the touch gesture. In FIG. 5B, the processor circuit 120 determines that the block where the touch operation 200 is located is the block 114_2, and therefore, the image frame is displayed in the block 114_2 where the touch operation 200 is located according to the position of the touch operation 200. Then, the touch operation 200 is moved to the block 114_3. Therefore, the processor circuit 120 determines that the block where the touch operation 200 is located is moved to the block 114_3. According to the position of the touch operation 200, the image frame is switched and displayed in the block 114_3 where the touch operation 200 is located, as shown in FIG. 5C.

Figure 6A:
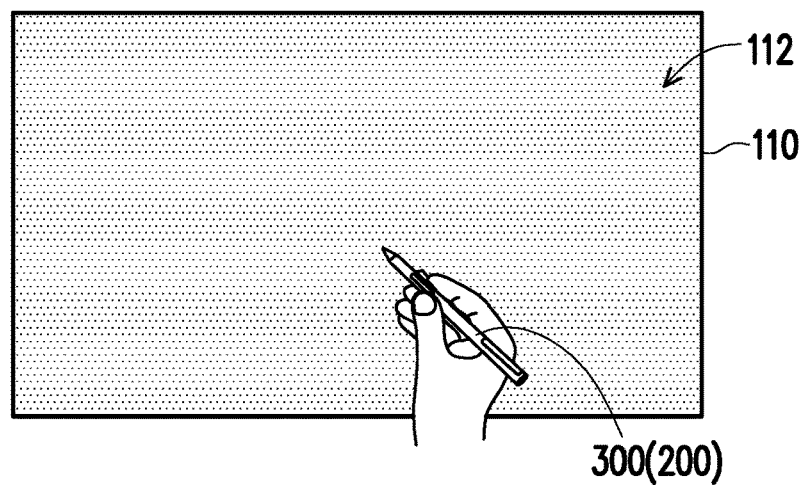
FIG. 6A, FIG. 6B, and FIG. 6C show a touch display screen of another embodiment of the invention switching display blocks of an image frame thereof according to a position of a touch operation.
Figure 6B:
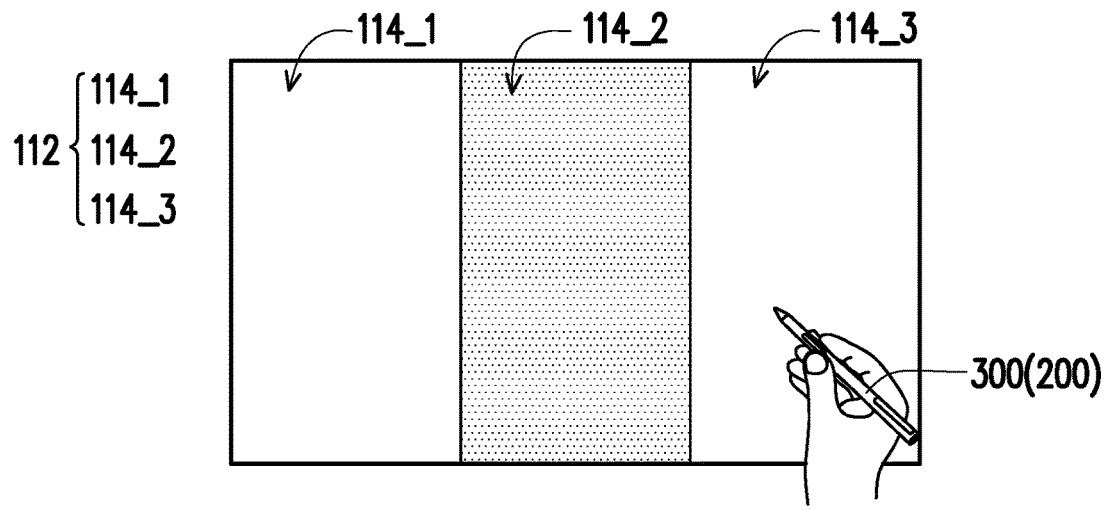
Figure 6C:
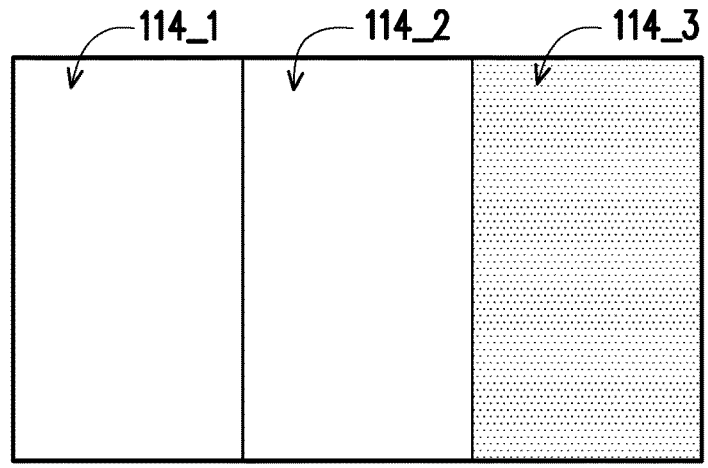

FIG. 6A, FIG. 6B, and FIG. 6C show a touch display screen of another embodiment of the invention switching display blocks of an image frame thereof according to the position of a touch operation. Referring to FIG. 6A to FIG. 6C, in FIG. 6A, the touch display screen 110 displays an image frame on the display interface 112 thereof in a full-screen manner. The touch operation 200 triggers the interface dividing function. The touch operation 200 is, for example, a stylus 300 tapping on the touch display screen 110. In the present embodiment, the display interface 112 is divided into the three blocks 114_1, 114_2, 114_3 as an example.

The processor circuit 120 determines the block where the touch operation 200 is located according to the position of the stylus 300. In FIG. 6B, the processor circuit 120 determines that the block where the touch operation 200 is located is the block 114_2, and therefore, the image frame is displayed in the block 114_2 where the touch operation 200 is located according to the position of the touch operation 200. Then, the touch operation 200 is moved to the block 114_3. Therefore, the processor circuit 120 determines that the block where the touch operation 200 is located is moved to the block 114_3. According to the position of the touch operation 200, the image frame is switched and displayed in the block 114_3 where the touch operation 200 is located, as shown in FIG. 6C.

In the embodiments of FIG. 5A to FIG. 6C, for the block displayed by the image frame, after the processor circuit 120 determines the block where the touch operation 200 is located, the image frame is automatically switched to the block for display, for example, but the invention is not limited thereto.

Figure 7A:
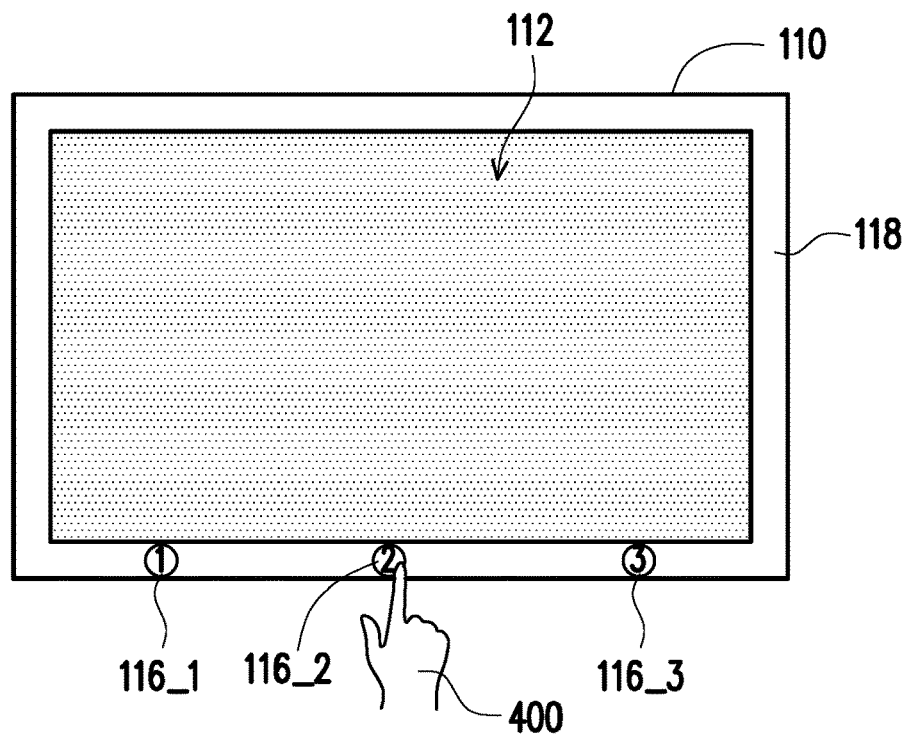
FIG. 7A and FIG. 7B show a touch display screen of an embodiment of the invention switching display blocks of an image frame thereof according to a switching signal.
Figure 7B:
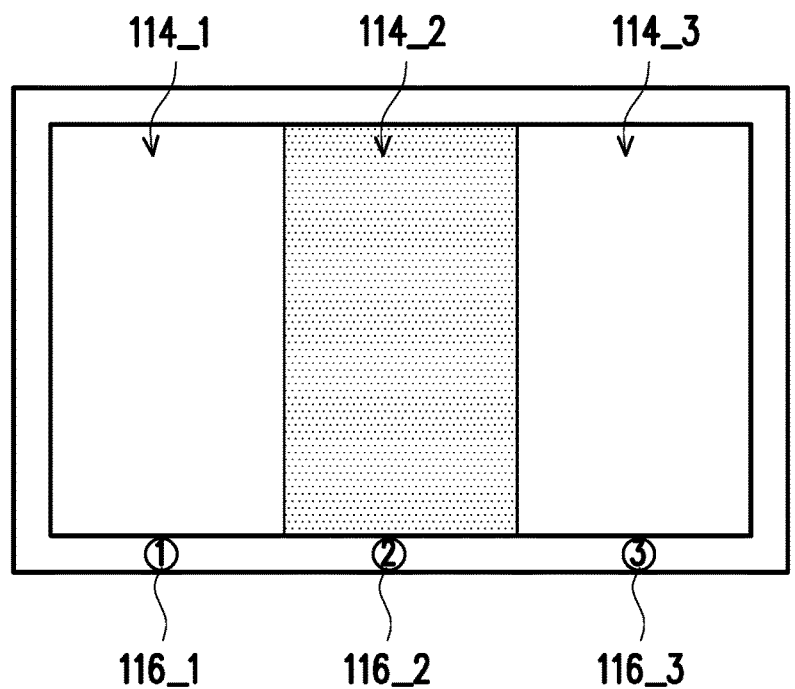

FIG. 7A and FIG. 7B show a touch display screen of an embodiment of the invention switching display blocks of an image frame thereof according to a switching signal. Please refer to FIG. 7A and FIG. 7B. In the present embodiment, the touch display apparatus 100 includes at least one button. In FIG. 7A, three buttons 116_1, 116_2, and 116_3 are taken as an example, but the number thereof is not used to limit the invention. In the present embodiment, the buttons 116_1, 116_2, and 116_3 are disposed at an outer frame region 118 of the touch display screen 110, and the number of buttons is the same as the number of divided blocks of the display interface 112. A user 400 may directly press any one of the buttons 116_1, 116_2, and 116_3 to trigger the interface dividing function. Moreover, according to the position of the touch operation, the user 400 may switch the image frame to the block where the touch operation 200 is located by directly pressing the corresponding one of the buttons 116_1, 116_2, and 116_3 and display the image frame therein.

In the present embodiment, after the buttons 116_1, 116_2, and 116_3 are pressed, a switching signal (not shown) is output to the processor circuit 120, and the image frame is displayed in the block 114_2 where the touch operation is located according to the switching signal.

Figure 8:
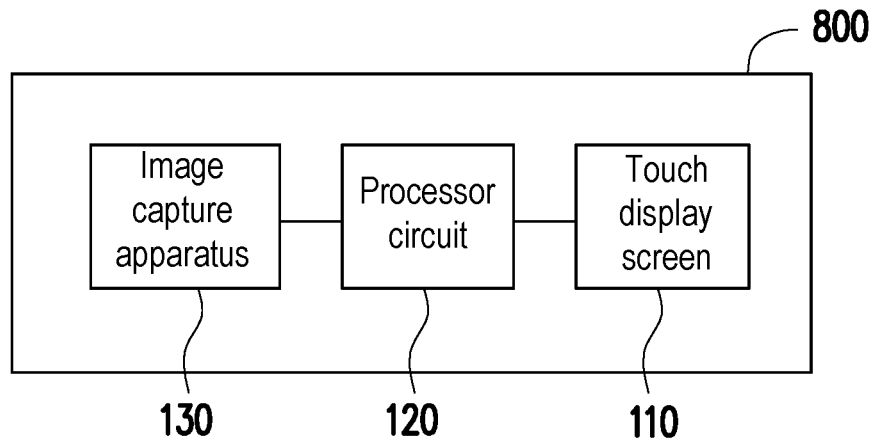
FIG. 8 shows a schematic diagram of a touch display apparatus of another embodiment of the invention.

FIG. 8 shows a schematic diagram of a touch display apparatus of another embodiment of the invention. Referring to FIG. 1 and FIG. 8, a touch display apparatus 800 of the present embodiment is similar to the touch display apparatus 100 of the embodiment of FIG. 1, but the main difference between the two is that, for example, the touch display apparatus 800 further includes an image capture apparatus 130. In other words, the touch display apparatus 800 supports an image recognition function.

Specifically, the image capture apparatus 130 is coupled to the processor circuit 120. The image capture apparatus 130 is configured to capture an image of the user, and obtain the body size of the user via measurement. In the present embodiment, the processor circuit 120 divides the screen width W of the touch display screen by the measured body size to calculate the interface dividing parameter [N]. In other words, as the denominator of the interface dividing parameter [N], the body size is measured by the image capture apparatus 130 of the touch display apparatus 800 instead of the preset body sizes B1, B2, and B3 shown in FIG. 4.

In the present embodiment, in addition to determining the block where the touch operation 200 is located according to the touch gesture or the position of the stylus 300, the processor circuit 120 may also determine the position of the touch operation 200 according to the image of the user 400.

In the present embodiment, the touch display apparatus 800 may recognize the user as a male, female, adult, minor, or person with limited mobility via the image recognition function. In an embodiment, the touch display apparatus 800 compares the captured image of the user with the database to obtain the measured body size.

In the present embodiment, the image capture apparatus 130 includes, for example, a similar apparatus such as a charge-coupled device image sensor (CCD image sensor) or a complementary metal-oxide semiconductor (CMOS) image sensor, and the invention is not limited thereto.

Figure 9:
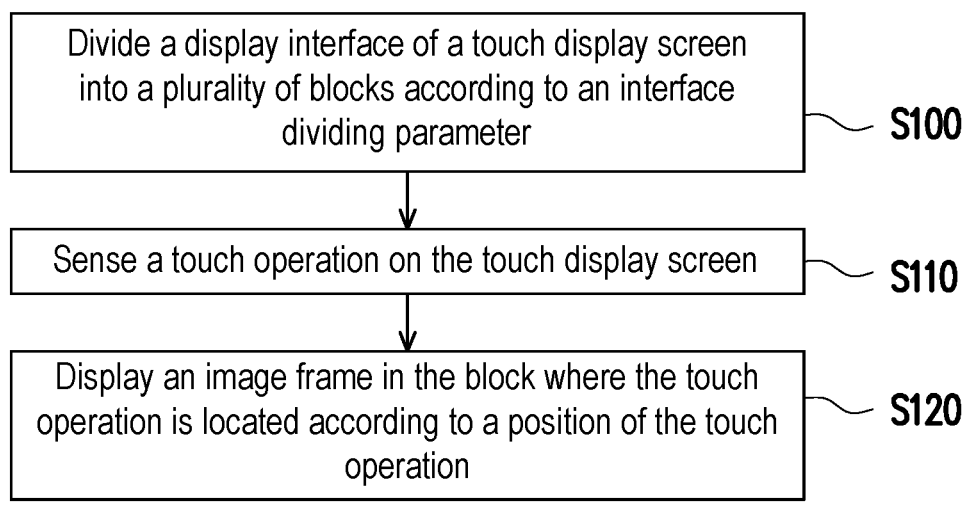
FIG. 9 shows a flowchart of steps of an operating method of a touch display apparatus of an embodiment of the invention.

FIG. 9 shows a flowchart of steps of an operating method of a touch display apparatus of an embodiment of the invention. Please refer to FIG. 1 and FIG. 9, the operating method of the touch display apparatus of the present embodiment is at least applicable to the touch display apparatus 100 of FIG. 1, but the invention is not limited thereto. Taking the touch display apparatus 100 of FIG. 1 as an example, in step S100, the processor circuit 120 divides the display interface of the touch display screen 110 into the plurality of blocks 114_1, 114_2, 114_3 according to the interface dividing parameter. The interface dividing parameter [N] is determined by dividing the screen width W of the touch display screen by the body size, and the body size may be preset or obtained via measurement. In step S110, the touch display screen 110 senses a touch operation on the touch display screen 110. In step S120, the processor circuit 120 displays the image frame in the block where the touch operation is located according to the position of the touch operation.

Moreover, sufficient teaching, suggestion, and implementation description of the operating method of the touch display apparatus of an embodiment of the invention may be obtained from the description of the embodiments of FIG. 1 to FIG. 8, and therefore the operating method of the touch display apparatus is not repeated herein.

Figure 10:
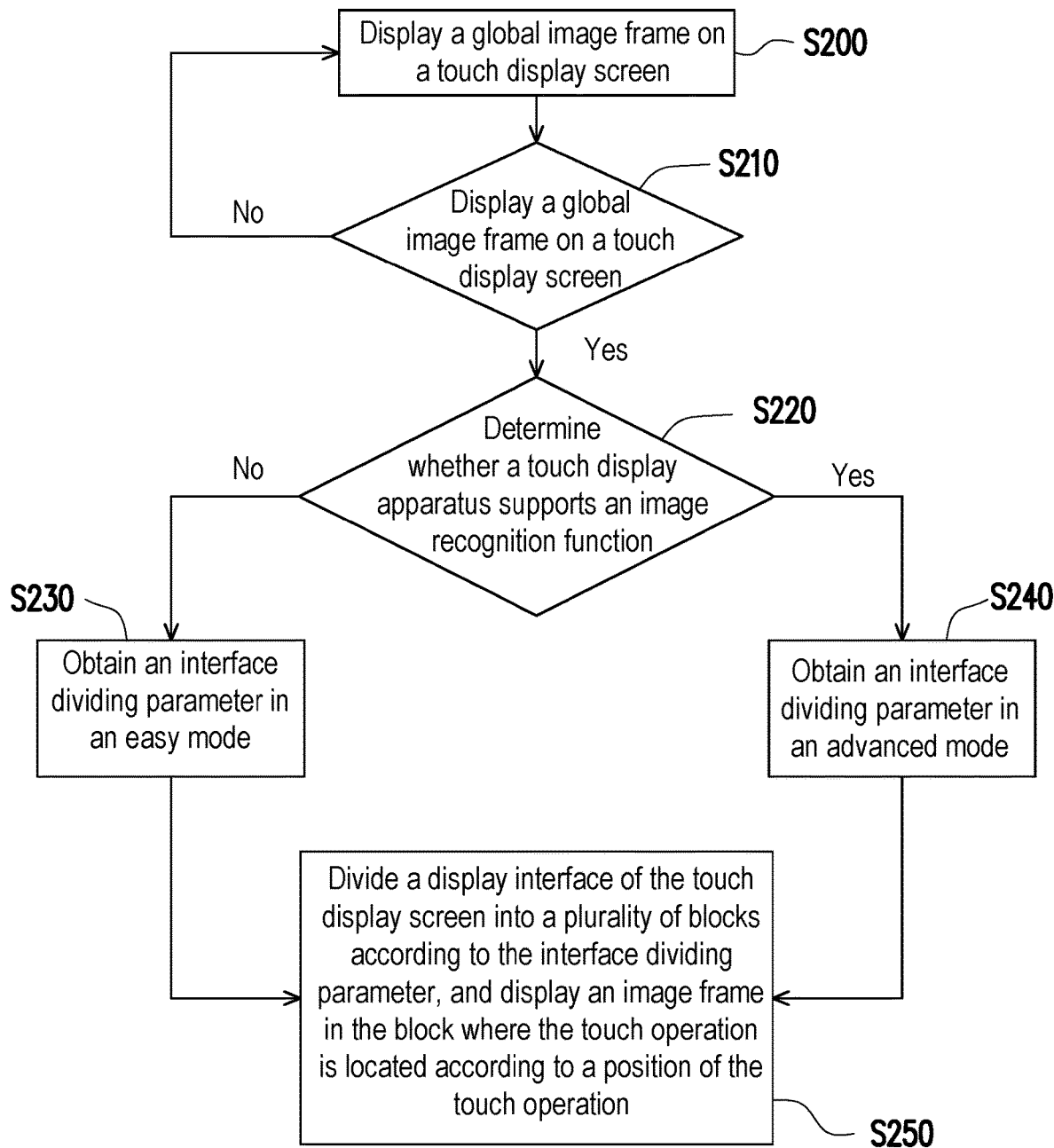
FIG. 10 shows a flowchart of steps of an operating method of a touch display apparatus of another embodiment of the invention.

FIG. 10 shows a flowchart of steps of an operating method of a touch display apparatus of another embodiment of the invention. Referring to FIG. 1 and FIG. 10, the operating method of the touch display apparatus of the present embodiment is at least applicable to the touch display apparatus 100 of FIG. 1 and the touch display apparatus 800 of FIG. 8, but the invention is not limited thereto.

In step S200, a global image frame is displayed on the touch display screen 110, as shown in FIG. 5A. In step S210, the processor circuit 120 determines whether the touch operation 200 on the touch display screen 110 is sensed. When the processor circuit 120 determines that the touch operation 200 on the touch display screen 110 is not sensed, the operating method of the touch display apparatus 110 returns to the step of displaying the global image frame on the touch display screen 110, that is, step S200. When the processor circuit 120 determines that the touch operation 200 on the touch display screen 110 is sensed, the operating method of the touch display apparatus 110 executes step S220. In step S220, the processor circuit 120 determines whether the touch display apparatus 100 supports an image recognition function.

When the touch display apparatus does not support the image recognition function, as shown in the touch display apparatus 100 of FIG. 1, the operating method of the touch display apparatus 110 executes step S230 (easy mode). In step S230, the processor circuit 120 may calculate the interface dividing parameter by calculation. Alternatively, the processor circuit 120 obtains the interface dividing parameter stored in the firmware by reading. The interface dividing parameter of step S230 is obtained by dividing the screen width W of the touch display screen 110 by a preset body size (easy mode calculation formula).

When the touch display apparatus supports the image recognition function, as shown in the touch display apparatus 800 of FIG. 8, the operating method of the touch display apparatus 110 executes step S240 (advanced mode). In step S240, the processor circuit 120 may calculate the interface dividing parameter by calculation. The interface dividing parameter of step S240 is obtained by dividing the screen width W of the touch display screen 110 by a measured body size (advanced mode calculation formula). Next, in step S250, the processor circuit 120 divides the display interface of the touch display screen 110 into a plurality of blocks according to the interface dividing parameter, and the image frame is displayed in the block where the touch operation 200 is located according to the position of the touch operation 200.

Moreover, sufficient teaching, suggestion, and implementation description of the operating method of the touch display apparatus of an embodiment of the invention may be obtained from the description of the embodiments of FIG. 1 to FIG. 9, and therefore the operating method of the touch display apparatus is not repeated herein.

Figure 11:
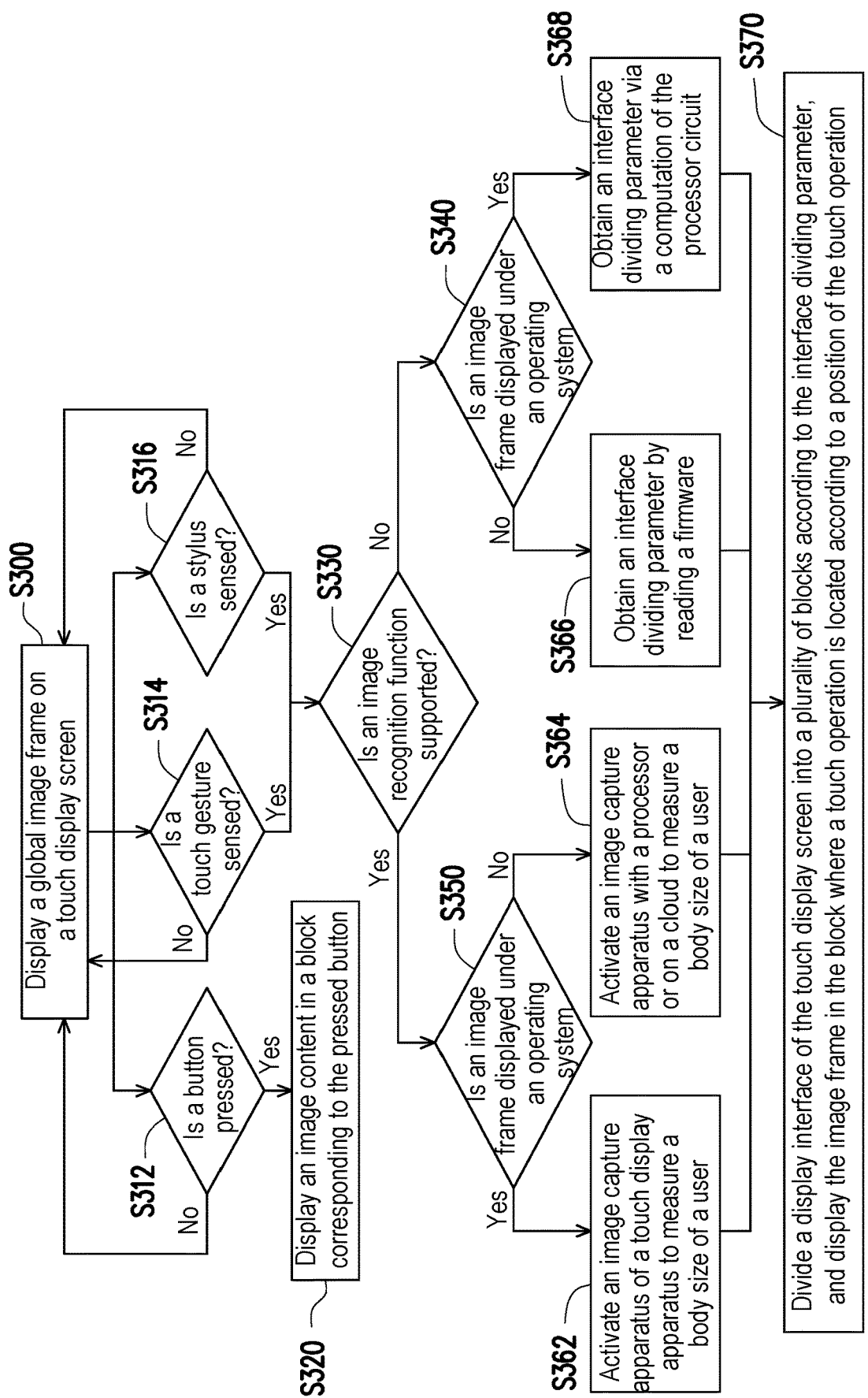
FIG. 11 shows a flowchart of steps of an operating method of a touch display apparatus of another embodiment of the invention.

FIG. 11 shows a flowchart of steps of an operating method of a touch display apparatus of another embodiment of the invention. Referring to FIG. 1 and FIG. 11, the operating method of the touch display apparatus of the present embodiment is at least applicable to the touch display apparatus 100 of FIG. 1 and the touch display apparatus 800 of FIG. 8, but the invention is not limited thereto.

In step S300, a global image frame is displayed on the touch display screen 110. In step S312, the processor circuit 120 determines whether the buttons 116_1, 116_2, 116_3 are pressed. If not, the operating method of the touch display apparatus returns to step S300. If yes, the processor circuit 120 executes step S320 to display the image frame in the block corresponding to the pressed button according to the switching signal.

In step S314, the processor circuit 120 determines whether a touch gesture operated on the touch display screen 110 is sensed. If not, the operating method of the touch display apparatus returns to step S300. If yes, the processor circuit 120 executes step S330.

In step S316, the processor circuit 120 determines whether the stylus 300 tapping on the touch display screen 110 is sensed. If not, the operating method of the touch display apparatus returns to step S300. If yes, the processor circuit 120 executes step S330.

In step S330, the processor circuit 120 determines whether the touch display apparatus supports an image recognition function. If not, the processor circuit 120 executes step S340. If yes, the processor circuit 120 executes step S350.

In step S340, the processor circuit 120 determines whether the touch display apparatus displays an image frame under the operating system thereof. If not, the processor circuit 120 executes step S366 to divide the touch display screen 110 into a plurality of blocks by reading the interface dividing parameter stored in the firmware. If yes, the processor circuit 120 executes step S368 to divide the screen width W of the touch display screen 110 by the preset body size to calculate the interface dividing parameter. In steps S366 and S368, the interface dividing parameter is obtained by dividing the screen width W of the touch display screen 110 by the preset body size.

In step S350, the processor circuit 120 determines whether the touch display apparatus displays an image frame under the operating system thereof. If yes, the processor circuit 120 executes step S362 to activate the image capture apparatus 130 of the touch display apparatus 800 to capture an image of the user, thereby obtaining the measured body size of the user. Moreover, the processor circuit 120 divides the screen width of the touch display screen by the measured body size to calculate the interface dividing parameter. If not, in step S364, the touch display apparatus 800 activates an image capture apparatus having a processor, or is connected to a cloud apparatus for image recognition function, to measures the body size of the user. Moreover, the processor circuit 120 divides the screen width of the touch display screen by the measured body size to calculate the interface dividing parameter. In steps S362 and S364, the interface dividing parameter is obtained by dividing the screen width W of the touch display screen 110 by the measured body size.

In step S370, the processor circuit 120 divides the display interface of the touch display screen 110 into a plurality of blocks according to the interface dividing parameter, and the image frame is displayed in the block where the touch operation 200 is located according to the position of the touch operation 200.

Moreover, sufficient teaching, suggestion, and implementation description of the operating method of the touch display apparatus of an embodiment of the invention may be obtained from the description of the embodiments of FIG. 1 to FIG. 10, and therefore the operating method of the touch display apparatus is not repeated herein.

Based on the above, in an embodiment of the invention, the interface dividing function of the touch display screen may be triggered by a touch operation or a physical button. The processor circuit divides a display interface of the touch display screen into a plurality of blocks according to an interface dividing parameter. The interface dividing parameter may be calculated by the processor circuit or read from a firmware by the processor circuit. The body size in the interface dividing parameter may be preset. In the touch display apparatus with image recognition function, the body size may also be measured by an image capture apparatus. After the display interface is divided into a plurality of blocks, according to the position of the touch operation or the physical button that is pressed, the image frame may be displayed in the block where the touch operation is located. Therefore, the operating method of the touch display apparatus of an embodiment of the invention may reduce the user's movement and search time so that the user may readily perform an interface operation, thus providing a good user experience.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A touch display apparatus, comprising:
    a touch display screen configured to display an image frame and sense a touch operation; and
    a processor circuit coupled to the touch display screen and configured to divide a display interface of the touch display screen into a plurality of blocks according to an interface dividing parameter, wherein the image frame is displayed in the block where the touch operation is located according to a position of the touch operation,
    wherein the processor circuit divides a screen width of the touch display screen by a preset body size or a measured body size to calculate the interface dividing parameter.

2. The touch display apparatus of claim 1, wherein the interface dividing parameter calculated by dividing the screen width of the touch display screen by the preset body size is stored in a firmware, wherein by reading the interface dividing parameter stored in the firmware, the processor circuit divides the touch display screen into the blocks according to the interface dividing parameter.

3. The touch display apparatus of claim 1, further comprising:
    an image capture apparatus coupled to the processor circuit and configured to capture an image of a user to obtain the measured body size of the user.

4. The touch display apparatus of claim 3, wherein the processor circuit determines the position of the touch operation according to the image of the user.

5. The touch display apparatus of claim 1, wherein
the touch operation comprises a touch gesture operated on the touch display screen, or a stylus tapping on the touch display screen, and
the processor circuit determines the block where the touch operation is located according to the touch gesture or a position of the stylus.

6. The touch display apparatus of claim 1, further comprising:
at least one button disposed in an outer frame region of the touch display screen and configured to output a switching signal according to the position of the touch operation, wherein the image frame is displayed in the block where the touch operation is located according to the switching signal.

7. An operating method of a touch display apparatus, wherein the touch display apparatus comprises a touch display screen, and the operating method comprises:
dividing the display interface of the touch display screen into a plurality of blocks according to an interface dividing parameter, wherein the interface dividing parameter is determined by dividing a screen width of the touch display screen by a body size;
sensing a touch operation on the touch display screen; and
displaying an image frame in the block where the touch operation is located according to a position of the touch operation.

8. The operating method of the touch display apparatus of claim 7, further comprising:
displaying a global image frame on the touch display screen; and
determining whether the touch operation on the touch display screen is sensed.

9. The operating method of the touch display apparatus of claim 8, further comprising:
returning to the step of displaying the global image frame on the touch display screen when it is determined that the touch operation on the touch display screen is not sensed; and
determining whether the touch display apparatus supports an image recognition function when it is determined that the touch operation on the touch display screen is sensed.

10. The operating method of the touch display apparatus of claim 9, further comprising:
dividing the screen width of the touch display screen by a preset body size to calculate the interface dividing parameter when the touch display apparatus does not support the image recognition function.

11. The operating method of the touch display apparatus of claim 9, further comprising:
dividing the touch display screen into the blocks according to the interface dividing parameter by reading the interface dividing parameter stored in a firmware when the touch display apparatus does not support the image recognition function, wherein the interface dividing parameter is calculated by dividing the screen width of the touch display screen by a preset body size, and is stored in the firmware.

12. The operating method of the touch display apparatus of claim 9, further comprising:
capturing an image of a user to obtain a measured body size of the user when the touch display apparatus supports the image recognition function; and
dividing the screen width of the touch display screen by the measured body size to calculate the interface dividing parameter.

13. The operating method of the touch display apparatus of claim 12, further comprising:
determining the position of the touch operation according to the image of the user.

14. The operating method of the touch display apparatus of claim 7, wherein the touch operation comprises a touch gesture operated on the touch display screen, or a stylus tapping on the touch display screen, and the operating method further comprises:
determining the block where the touch operation is located according to the touch gesture or a position of the stylus.

15. The operating method of the touch display apparatus of claim 7, wherein the touch operation comprises a touch gesture operated on the touch display screen, or a stylus tapping on the touch display screen, and the operating method further comprises:
outputting a switching signal from at least one button according to the position of the touch operation; and
displaying the image frame in the block where the touch operation is located according to the switching signal.

* * * * *